Figure 7:
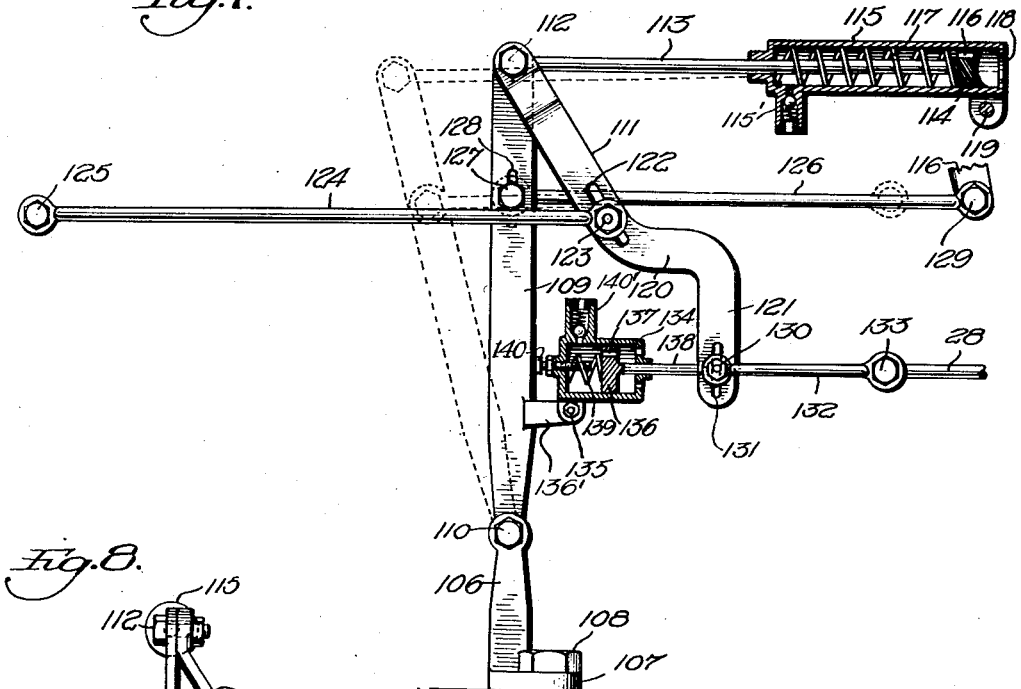

July 6, 1937.  E. G. HILL ET AL  2,086,501
CLUTCH CONTROL MECHANISMS
Filed Aug. 10, 1934  3 Sheets-Sheet 1
Fig.1.
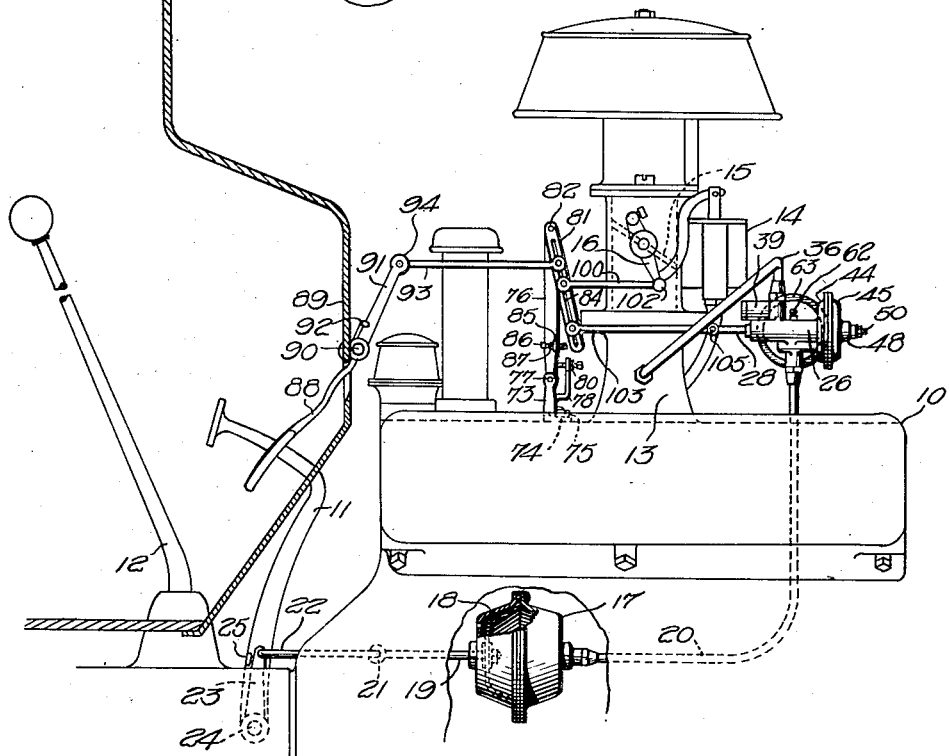
Fig.2.
Fig.3.
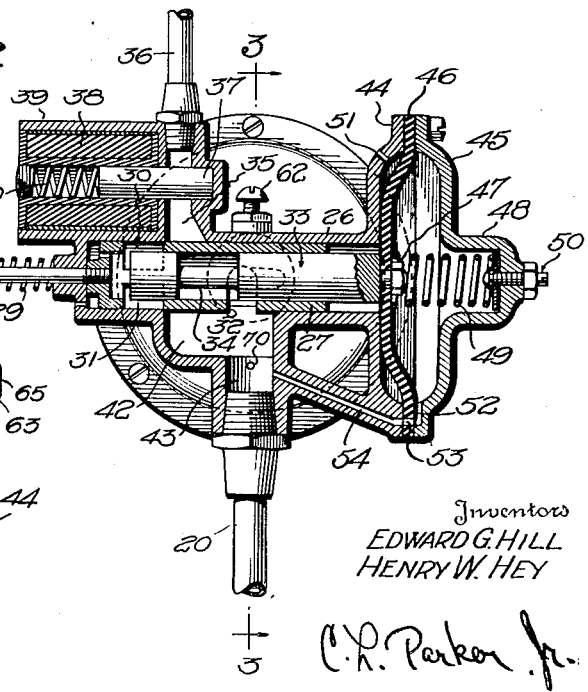
Inventors
EDWARD G. HILL
HENRY W. HEY
C. L. Parker Jr.
Attorney

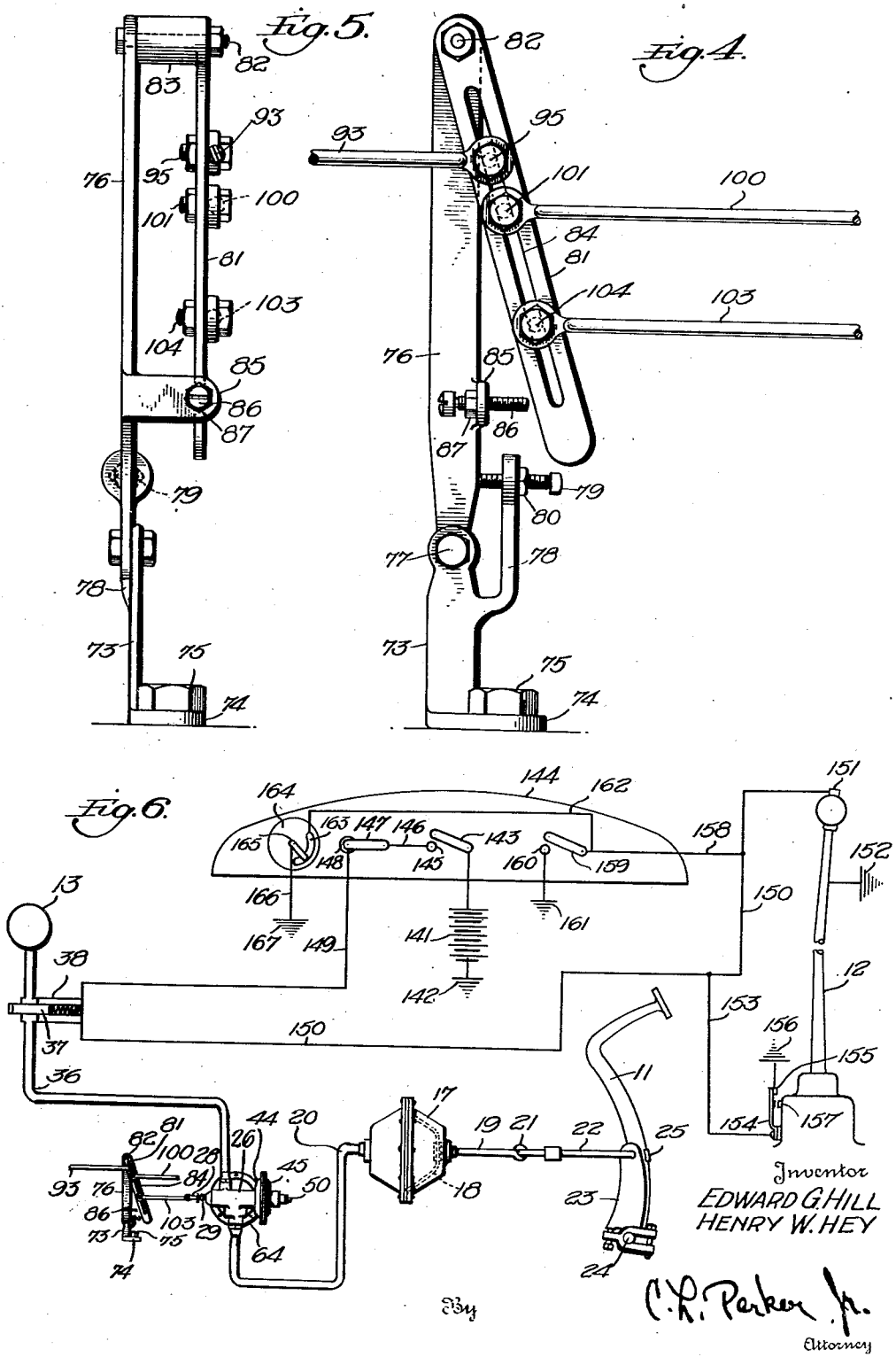

July 6, 1937. E. G. HILL ET AL 2,086,501
CLUTCH CONTROL MECHANISMS
Filed Aug. 10, 1934 3 Sheets-Sheet 3

Inventors
EDWARD G. HILL
HENRY W. HEY

By C. L. Parker Jr.
Attorney

Patented July 6, 1937

2,086,501

UNITED STATES PATENT OFFICE 2,086,501

CLUTCH CONTROL MECHANISMS

Edward G. Hill, South Bend, Ind., and Henry W. Hey, Richmond, Va., assignors to Hill Engineering Corporation, Richmond, Va., a corporation of Virginia Application August 10, 1934, Serial No. 739,318

23 Claims. (Cl. 192—.01)

This invention relates to clutch control mechanisms for motor vehicles.

Many efforts have been made during the past few years to provide an efficient mechanism for automatically controlling the operation of a motor vehicle clutch, particularly in conjunction with the manual operation of the engine throttle. Practically all of the development work along this line, so far as we are aware, has been done in connection with the control valve or valves through which the clutch has been disengaged upon the closing of the vehicle throttle and engaged upon opening movement of the vehicle throttle. In the prior patent of Edward G. Hill, No. 1,964,693, granted June 26, 1934, there is disclosed a valve mechanism which, so far as can be determined by the present developments in the art of clutch control mechanisms, performs all of the possible functions of a control valve mechanism in determining the operation of the motor vehicle clutch. The present invention, therefore, contemplates no improvement over the operating valve mechanism per se, but provides improved means for controlling the operation of such valve mechanism.

An important object of the present invention is to provide a novel control mechanism for the engine throttle and the clutch control valve mechanism, operated from the accelerator pedal of the vehicle.

More specifically, an important object of the invention is to provide operating means of the character referred to which functions to provide a relatively rapid releasing of the clutch elements for movement toward operative engagement and then checking the movement of such elements prior to any substantial opening movement of the engine throttle whereby relatively rapid clutch engagement is permitted to take place.

A further object is to provide operating means of the character referred to which functions to provide initial operation of the clutch control valve mechanism at a relatively faster rate than the opening movement of the throttle, from the idling position of the latter, and upon further opening movement of the throttle, to provide faster movement of the throttle than of the control valve mechanism, thus providing the two results of permitting the clutch to move rapidly to the point where its movement is checked, and then to provide relatively slower controlled movement of the clutch elements upon increased engine speeds whereby smooth clutch engagement is obtained.

Conversely, an important object of the invention is to provide relatively faster movement of the control valve mechanism than of the throttle as the latter approaches idling position upon the releasing of the accelerator to thereby effect extremely rapid disengagement of the clutch upon the releasing of the accelerator pedal to prevent the transmission of motor drag to the vehicle when the clutch is released.

A further object is to provide a device of the character referred to wherein the travel of the clutch control valves is substantially shortened, thus permitting the use of a smaller valve mechanism with a consequent reduction in the cost of manufacture of such mechanism.

A further object is to provide means operable when the accelerator is suddenly released for slightly retarding the return movement of the throttle to idling position without affecting the operation of the control valve mechanism, thus providing a rapid releasing of the clutch elements to prevent the transmission of motor drag to the vehicle.

A further object is to provide means automatically operable upon the rapid depression of the accelerator pedal from idling position for changing the ratio of movement between the control valve mechanism and the throttle whereby the latter operates relatively more rapidly with respect to the control valve mechanism to provide a relatively fast clutch engagement.

A further object is to provide lever means for transmitting movement from the accelerator pedal to the throttle and to the control valve mechanism and wherein the effective lever lengths controlling the movement of the throttle and control valve mechanisms are altered under different operating conditions to provide the foregoing results.

Other objects and advantages of the invention will become apparent during the course of the following description.

Figure 8:
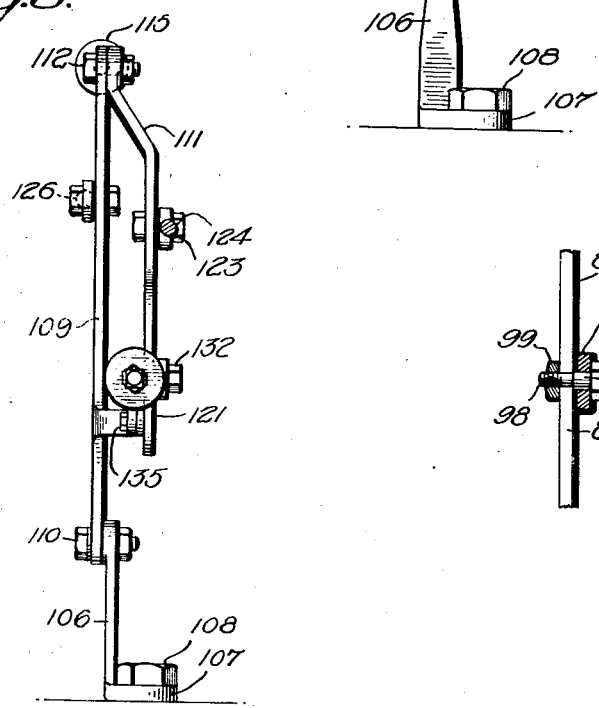
Figure 9:
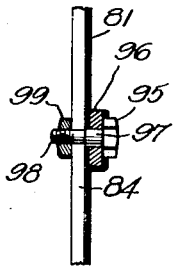

In the drawings we have shown several embodiments of the invention. In this showing:

Figure 1 is a side elevation of a motor vehicle power plant showing the invention applied, a portion of the vehicle being shown in section, Figure 2 is a central longitudinal sectional view through the control valve mechanism, Figure 3 is a section on line 3—3 of Figure 2, Figure 4 is an enlarged side elevation of the control levers and associated parts, Figure 5 is an edge elevation of the same, Figure 6 is a diagrammatic view showing an electrical system particularly adapted for use with the apparatus, Figure 7 is a side elevation of a modified form of control lever means, parts being shown in section, Figure 8 is an edge elevation of the same, and, Figure 9 is a detail sectional view illustrating one means to provide an adjustable connection between the lever means and one of its associated rod connections.

Referring to Figure 1, the numeral 10 designates a motor vehicle engine shown in the present instance as being of the V-type. The engine delivers power in the usual manner through a suitable clutch (not shown) operable by a clutch pedal 11, and through a transmission controlled by a gear shift lever 12. The engine is provided with the usual intake manifold 13 to the upper end of which is connected a carbureter indicated by the numeral 14 and provided with the usual throttle 15. This throttle is operable through the usual throttle arm 16.

Any suitable form of power device may be employed for operating the clutch pedal 11. In the present instance such power device has been illustrated as comprising a pair of casing sections 17 having a diaphragm 18 connected therebetween and connected to a pull rod 19 extending through the rear casing section 17. The latter casing section may be vented to the atmosphere in the usual manner and a pressure differential is established in the power device, to disengage the clutch, by establishing a partial vacuum in the forward casing section 17 through the medium of a vacuum conduit 20, in a manner to be described.

The left end of the rod 19 (see Figure 1) is connected as at 21 to the right end of a cable 22, and the left end of this cable is connected to the upper end of an operating arm 23. The lower end of the arm 23 is rigidly connected to the clutch operating shaft 24. It is preferred that the pedal 11 be freely rotatable with respect to the shaft 24 so that the latter may be operated by the power device without transmitting movement to the pedal. When such form of clutch operating means is employed, the pedal 11 is provided with a lug 25 engageable with the arm 23 to operate the clutch when the pedal 11 is depressed by the foot of the operator.

As previously stated, the present invention is adapted for use in connection with the valve mechanism disclosed in the patent to Edward G. Hill No. 1,964,693, although it is not limited to use in connection with such valve mechanism. It has been found however, that the invention to be described operates particularly efficiently in connection with such valve mechanism, and because of this fact, such valve mechanism has been illustrated in Figures 2 and 3 of the drawings. It will be understood, however, that the control valve mechanism forms no part of the present invention, except in combination with the control means therefor.

Referring to Figures 2 and 3, the numeral 26 designates a cylindrical valve casing in which a cylindrical valve 27 is slidable. This valve is operated by a rod 28, in a manner to be described, and a spring 29 urges the stem 28 and valve 27 to the left, as will be apparent. The valve 27 is provided with opposite arcuate vacuum ports 30 and 31 and an arcuate atmospheric port 32. A second valve 33 is slidable within the valve 27 and is provided intermediate its ends with a reduced portion 34 forming a port operable in a manner to be described for con-31 and between the port 32 and the atmosphere.

The valve casing 26 is provided with a vacuum port 35 connected at its opposite end to a vacuum conduit 36, leading to the intake manifold 13, as shown in Figure 1. Communication through the port 35 is controlled by a valve 37, as shown in Figure 2. A solenoid 38 is mounted in a casing 39, preferably formed integral with the valve casing 26, and the valve 37 forms the armature of the solenoid 38. A light spring 40 tends to urge the valve 37 to closed position, and the valve 37 opens when the solenoid 38 is energized in a manner to be described.

When the valve 27 is moved toward the right from the position shown in Figure 2, the ports 30 and 31 communicate with the cut out portion of the valve 33, thus affording communication between the port 35 and a port 42 formed in the valve casing 26 and elongated longitudinally thereof to afford constant communication with the valve port 32. A laterally extending passage 43, also formed in the valve casing 26, is connected to one end of the vacuum conduit 20, previously described.

The valve casing 26 is enlarged at the end opposite the valve rod 28 to form an annular casing section 44. A second similar annular casing section 45 is arranged adjacent the casing section 44 and a diaphragm 46 is arranged between these casing sections. The diaphragm 46 is connected to the valve 33 as at 47. The casing section 45 is provided with an axial extension 48 in which is arranged a spring 49 tending to urge the valve 33 toward the left as viewed in Figure 2. Any suitable means, such as the screw means 50, may be employed for adjusting the operating tension of the spring 49.

The casing section 44 is vented to the atmosphere as at 51, and the pressure in the casing section 45 is dependent upon the pressure in the right casing section 17 of the power device. The casing section 45 is provided with a port 52 communicating through a port 53 in the diaphragm 46 with a small conduit 54 leading to the passage 43. Since the passage 43 communicates with the power device and with the chamber formed between the casing section 45 and diaphragm 46, it will be apparent that the latter element is controlled in accordance with the differential pressure in the power device to thus determine the position of the valve 33.

The valve casing 26 carries a lateral extension 55 in which is formed an air chamber 56 communicating with the atmosphere through a relatively large port 57. A port 58 communicates at one end with the valve port 30 and a valve 59 engages a seat 60 to control communication between the port 58 and chamber 56. A bleed port 61 affords communication between the port 58 and the atmosphere and the effective area of the port 61 may be adjusted by means of a suitable screw 62.

The lateral extension 55 carries an annular casing section 63 coacting with a similar casing section 64 to receive a diaphragm 65 therebetween. The inner face of the diaphragm 65 is subjected to atmospheric pressure in the chamber 56, as will be apparent. The valve 59 carries a stem 66 connected to the diaphragm 65, and movement of this diaphragm accordingly controls the valve 59. An axial extension 67 is carried by the casing section 64 and houses the outer end of a relatively light spring 68, the inner end of this spring seating against the diaphragm 65 to tend to urge the ing means indicated as a whole by the numeral 69 is employed for adjusting the effective tension of the spring 68. A vacuum passage 70 communicates at one end with the passage 43 and at its opposite end with the chamber formed between the diaphragm 65 and casing section 64, the latter two elements being provided with passages or ports 71 and 72 for this purpose.

The lever operating means for the throttle and valve mechanism is shown in detail in Figures 4 and 5, and is illustrated in Figure 1 in its relationship to the other parts of the apparatus. Referring to Figures 4 and 5 the numeral 73 designates an upstanding bracket having a base portion 74 secured as at 75 to the intake manifold or any other portion of the vehicle engine. A lever 76 is pivotally connected at its lower end to the bracket 73 as at 77. An arm 78 is carried by or formed integral with the bracket 73 and carries a stop screw 79 at its upper end engageable with the lever 76 to limit the turning movement of the latter in a clockwise direction about the axis of the bolt 77. A lock nut 80 secures the screw 79 in adjusted positions.

A second lever 81 is pivotally connected at its upper end as at 82 to the upper end of the lever 76. In the installation illustrated, the lever 81 is laterally offset from the lever 76 to place it in proper alinement for connection with the throttle arm 16 and valve rod 28. For this purpose, the lever 81 is provided with a laterally extending boss 83 and the pivot bolt 82 passes through the boss 83 and the upper end of the lever 76. The lever 81 is provided with a slot 84 extending throughout the greater portion of its length to provide adjusting means for the various rods connected to the lever 81. An arm 85 extends laterally from the lever 76 and carries a stop screw 86 engageable against the lever 81 to limit the turning movement thereof in a clockwise direction around the axis of the bolt 82. The lock nut 87 secures the screw 86 in adjusted positions.

Referring to Figure 1 the numeral 88 designates the accelerator pedal extending through the vehicle dash 89. The pedal 88 forms one end of a lever pivotally supported intermediate its ends as at 90. The other end 91 of this lever is arranged in the engine compartment, and a spring 92 urges the accelerator pedal upwardly and the lever arm 91 forwardly. As shown in Figure 1, a rod 93 is pivotally connected at its left end as at 94 to the upper end of the lever arm 91, and at its right end the rod 93 carries a pivot bolt 95 adjustable with respect to the slot 84 and adapted to be secured in any desired position along the lever 81.

The pivotal connection between the rod 93 and the lever 81 may be of the type illustrated in detail in Figure 9 of the drawings. The rod 93 is provided with a circular end 96, and the bolt 95 is provided with a shank 97 extending therethrough. The bolt is further provided with a reduced portion 98 extending through the slot 84 and provided on its free end with a nut 99. This nut may be drawn up tight against one side of the lever 81 while the shoulder at the end of the shank 97 engages the other side of this lever. Thus it will be apparent that the bolt 95 may be fixed in adjusted positions with respect to the lever 81, while the rod 93 is free to turn about the shank 97.

Referring to Figures 1 and 4, a rod or link 100 is pivotally connected at its left end to the lever 81 as at 101 and the right end of the link 100 is pivotally connected to the throttle arm 16 as at 102. These pivotal connections may be of the type illustrated in Figure 9 to permit proper securing of the pivot members without binding the pivotal connections of the link 100. Obviously the pivot bolt 101 may be secured in any adjusted position along the slot 84. A similar link 103 is pivotally connected at its left end (see Figures 1 and 4) to the lever 81 as at 104 and at its right end to the left end of the valve rod 28 as at 105.

In Figures 7 and 8 a somewhat modified form of lever means is illustrated. A bracket 106, corresponding to the bracket 73 previously described, is provided with a foot portion 107 secured to any stationary part of the motor vehicle engine as at 108. A lever 109 is pivotally connected at its lower end to the bracket 106 as at 110. A second lever 111 is pivotally connected at its upper end as at 112 to the upper end of the lever 109. A rod 113 is also connected at one end to the pivot member 112 and carries a piston 114 at its opposite end operable in a cylinder 115. The piston 114 is provided with a relatively small port 116 therethrough, and a spring 117 urges the piston 114 toward the right as viewed in Figure 7. The piston 114 and its port 116 operate as a dash pot to tend to retard movement of the upper end of the lever to the right when the accelerator pedal is suddenly released from a depressed position, for a purpose to be described. As will become apparent, the spring 117 is not essential, but may be provided as the return spring for the engine throttle. The right end of the cylinder 115 is open to the atmosphere as at 118, and the cylinder 115 is pivotally supported as at 119 to permit it to alter its position in accordance with the pivoting movement of the lever 109. The left end of the cylinder 115 (see Figure 7) may be provided with a check valve 115' to permit unrestricted movement of the piston 114 toward the right.

The lever 111 may be shaped as shown in Figure 7 with the ends adjacent the pivot thereof sloping toward the right and downwardly with respect to the lever 109, then toward the right and substantially horizontally as at 120, and then downwardly substantially vertically as at 121. The sloping portion of the lever 111 is slotted as at 122 to receive an adjustable pivot pin 123 which connects the right end of an accelerator pull rod 124 to the lever 111. The left end of the rod or link 124 is adapted for pivotal connection as at 125 to the accelerator lever arm 91. A similar link 126 has a pivot member 127 at its left end adjustable in a slot 128 formed in the lever 109. The right end of the link or rod 126 is pivotally connected as at 129 to the throttle arm 116.

A pivot bolt 130 is adjustably mounted in a slot 131 formed in the vertical portion 121 of the lever 111. As shown in Figure 7 pivot member 130 connects the left end of a link 132 to the free end of the lever 111, and the right end of the link 132 is pivotally connected as at 133 to the left end of the valve rod 28.

A small cylinder 134 is pivotally connected as at 135 to an arm 136' carried by or formed integral with the lever 109. A piston 136 is mounted in the cylinder 134 and is provided with a small port 137 therethrough. A piston rod 138 is connected to the piston 136 and is pivotally connected at its right end to the lever 111 by the pivot member 130. A spring 139 urges the piston 136 toward the right, and an adjustable set screw 140 limits the movement of the piston 136 toward the left in the cylinder 134, for a purpose to be described. A small check valve 140' permits unrestricted movement of the piston 136 toward the left.

An electrical system adapted for use in connection with the apparatus is illustrated in Figure 6. The battery 141 of the vehicle has one side grounded as at 142 and the other side connected to an ignition switch 143 mounted on the instrument panel 144. The switch 143 is engageable with a contact 145 leading in the usual manner to the ignition system (not shown) of the vehicle. The contact 145 is also connected as at 146 to a main control switch 147 engageable with a contact 148. The switch 147 is closed to render the clutch control mechanism operative and is opened to permit manual control of the clutch, as will become apparent. The contact 148 is connected by a wire 149 to one terminal of the solenoid 38. In this connection it will be noted that the solenoid, in practice, is made a part of the main valve mechanism, and for the purpose of illustration the solenoid is illustrated in Figure 6 as being arranged in the conduit 36.

The other terminal of the solenoid is connected to one end of a wire 150 leading to a button 151 mounted at the upper end of the gear shift lever, and such lever is indicated as being grounded as at 152. A branch wire 153 leads from the wire 150 to a switch arm 154 normally engaging a contact 155 grounded as at 156. The second and high speed shift rod 157 of the vehicle transmission moves toward the right as viewed in Figure 6 when the gear shift lever is in high gear position to move the switch arm 154 out of engagement with the contact 155, for a purpose to be described.

A branch wire 158 leads to a switch arm 159 engageable with a contact 160 grounded as at 161. A wire 162 leads from the wire 158 to an arcuate contact 163 which may be mounted in the speedometer 164. A switch arm 165 is movable with the speedometer and engages the arcuate contact 163 at low vehicle speeds, for example, from zero speed to a predetermined maximum speed of eight to ten miles per hour. A wire 166 leads from the switch arm 165 to a ground 167.

The operation of the apparatus is as follows:

The operation of the main valve mechanism is described in detail in the prior patent of Edward G. Hill No. 1,964,693 and no specific description of such mechanism need be repeated here. In a manner to be described, the valve 27 moves to the position shown in Figure 2 when the throttle is opened to a predetermined extent, and when the throttle is released for movement to idling position, the valve 27 moves substantially to its limit of movement toward the right as viewed in Figure 2. Movement of this valve as the accelerator pedal is released moves the port 32 out of registration with the reduced portion 34 of the valve 33, thus cutting off communication between the port 42 and the air port 58 (see Figure 3) and at the same time, the ports 30 and 31 will be moved into communication with the reduced portion 34 of the valve 33 to connect the power device 17 to the intake manifold through ports 35 and 42 and the conduit 36. Under such conditions it is assumed that the solenoid valve 37 is open, and this valve is controlled in a manner to be described.

The operation of the valve mechanism in the manner described obviously effects declutching, and clutch reengagement takes place upon the opening of the throttle. When the accelerator pedal is depressed, the valve 27 moves to the left to disconnect the power device from the intake manifold and admit air into the power device through port 57, chamber 56, passage 58, ports 32 and 42, passage 43 and pipe 20. In this connection, it will be noted that when the power device is connected to the intake manifold to effect declutching, the vacuum chamber of the casing section 64 (see Figure 3) is subjected to the reduced pressure of the power device through ports 70, 71 and 72, while the vacuum chamber within the casing section 45 (see Figure 2) is subjected to the same reduction in pressure through the ports 52, 53 and 54. Thus the valve 59 will be maintained open, while the diaphragm 46 will hold the valve 33 toward the right as viewed in Figure 2.

The admission of air into the power device upon movement of the valve 33 toward the left as viewed in Figure 2 reduces the differential pressure in the power device to release the clutch elements for movement toward operative engagement. The speed of movement of the power device diaphragm 18 incident to the pressure of the clutch springs tends to maintain a reduced pressure in the power device and in the suction chambers within the casing sections 45 and 64. In this connection it will be noted that the spring 68 is very light, and only a slight differential pressure is necessary on opposite sides of the diaphragm 65 to hold the valve 59 open. The spring 49 is somewhat stronger, but the reduced pressure maintained in the casing section 45 during initial movement of the clutch elements upon the partial opening of the throttle is sufficient to hold the valve 33 in its position toward the right as viewed in Figure 2. A slight increase in pressure in the casing section 45 occurs upon the initial light contacting of the clutch elements, whereupon the spring 49 effects slight movement of the valve 33 toward the left to move the reduced shank portion 34 out of registration with the port 32, thus cutting off the further admission of air into the power device. If the throttle is partially opened and its movement is then stopped, the clutch elements will remain indefinitely in a position lightly contacting with each other. Under such conditions, any tendency of the clutch elements to overrun the position indicated is prevented, since such action can occur only upon a reduction in the differential pressure in the power device which would react in the diaphragm casing section 45 to cause the valve 33 to move to a slightly greater extent toward the left thus slightly opening the ports 30 and 31 to communication with each other, thus reestablishing the proper pressure differential in the power device.

If the throttle is progressively opened without being stopped in the manner indicated, the movement of the valve 33 incident to the initial engagement of the clutch elements will not operate to completely arrest movement of the clutch elements, since the valve 27 will be progressively moving as the throttle is progressively opened. Accordingly, the movement of the clutch elements will be retarded approximately at the point of initial engagement and then will continue to move slowly into operative engagement as the throttle is progressively opened to accelerate the engine speed.

The electrical system disclosed in Figure 6 is particularly adapted for use with the present apparatus to provide selective operation, but the use of such system is not at all essential. When the ignition switch 143 and the main control switch 147 are closed and the vehicle is in first, second or reverse gears to permit the switch 154 to remain closed, the solenoid 38 will remain energized, and accordingly operation of the clutch control mechanism is wholly dependent upon the operations of the valves 27 and 33. Accordingly, declutching will be effected at each releasing of the accelerator pedal except when in high gear and below a predetermined speed. For example, if the vehicle speed is above the speeds at which the brush 165 engages the contact 163 when the vehicle is in high gear, the solenoid 38 will be deenergized, provided the switch 159 is open and the button 151 is released, and the accelerator may be released without declutching, thus permitting the engine to be used as a brake.

From the foregoing it will be apparent that the system provides automatic free wheeling in first, second and reverse gears under the conditions referred to but automatic declutching will occur in high gear only in the speed range in which the brush 165 engages the contact 163. The switch 159 shunts the wire 150 to ground under all conditions, when closed, and the operation of the apparatus under such conditions cannot be affected by the position of the gear shift lever. The closing of the switch 159, therefore, provides automatic free wheeling under all conditions, whenever the accelerator is released. The button 151 is provided to permit declutching upon the releasing of the accelerator pedal when in high gear and at relatively high vehicle speeds to permit shifting into second gear without awaiting vehicle deceleration to the point at which the brush 165 engages the contact 163.

The foregoing description covers the operation of the main valve mechanism and the electrical system, and will render the operation of the control means for the main valve mechanism more readily understood. In most prior clutch control mechanisms of which we are aware, the initial opening movement of the throttle takes place simultaneously with the initial operation of the valve mechanism through which the clutch elements are brought into engagement. The present mechanism, under ordinary conditions, provides operation of the valve mechanism slightly prior to throttle operation, thus putting the clutch elements in a condition for operative engagement upon opening movement of the throttle. In many vehicle installations, this is unnecessary, but its use is desired with several types of vehicles in which rapid engine acceleration takes place upon opening movement of the throttle. With vehicles of the latter type the present mechanism provides clutch engagement without the spinning of the motor and the wearing of the clutch elements incident thereto. Moreover, the present device provides far more rapid clutch disengagement with respect to throttle position, thus preventing the transmission of motor drag to the vehicle upon the release of the accelerator pedal.

Referring to Figures 1 and 4, it will be noted that the accelerator lever arm 91 is connected to the lever 81 by the link 93, and when the throttle is in idling position the levers 76 and 81 occupy the positions shown in Figure 4. The lever 76 is in engagement with the stop screw 79, while the lever 81 is slightly spaced from the screw 86. The initial movement of the accelerator 88 from idling position, therefore, swings the lever 81 about its pivot 82 without transmitting any movement to the lever 76 until the lever 81 contacts with the stop screw 86. The throttle connection 100 has its pivotal connection 101 arranged much closer to the pivot 82 than the pivotal connection 104 of the link 103. Upon initial depression of the accelerator pedal therefore, the valve 27 initially moves much more rapidly than the throttle, and accordingly the clutch elements will be released for movement toward operative engagement and then checked before the throttle opens to any substantial extent. The clutch elements are then ready to move into operative engagement upon further opening movement of the throttle, and since the movement of the clutch elements to the point of initial engagement occurs very rapidly and prior to substantial motor acceleration, the motor is prevented from spinning prior to initial clutch engagement, thus preventing any undue wearing of the clutch elements.

The checking of the movement of the clutch elements preferably occurs at least as early as the contact between the lever 81 and stop screw 86, and the latter element is adjustable to permit the checking action to occur at the desired point. After engagement of the lever 81 and screw 86 takes place, further depression of the accelerator pedal causes the levers 81 and 76 to move as a unit, the latter lever pivoting on the axis of the screw 77. Such further movement accordingly takes place with the pivot of the screw 104 closer to the axis of rotation than the axis of the screw 101, and accordingly opening movement of the throttle becomes relatively faster than movement of the valve 27. This fact permits the valve mechanism to be made shorter, since the length of movement of the valve 27 in proportion to the throttle movement is shortened over previous constructions. However, in previous devices, it has been necessary to make the valve mechanism relatively long in order to permit valve movement throughout the range of movement of the accelerator throttle. This is unnecessary in the present construction, however, as will become apparent. Full clutch engagement obviously takes place long before the throttle reaches its fully open position, and the present device renders it unnecessary for the valve 27 to continue its movement beyond the point where full clutch engagement has taken place. At the latter point, or slightly therebeyond, the valve 27 engages the left hand end of the valve cylinder 26, as shown in Figure 2, whereupon the lever 81 can no longer move as a unit with the valve 76. Further movement of the throttle toward open position by depressing the accelerator, therefore, causes the lever 76 to swing about its pivot 77, while the lever 81 swings slightly in a counter-clockwise direction about its pivot 82, the pivot 104 remaining relatively stationary. The movement of the upper end of the lever 81, however, permits the link 93 to continue to transmit movement to the link 100 to continue the opening movement of the throttle.

The reduced ratio of movement of the valve 27, and the fact that this valve need not move after full clutch engagement has taken place, permits a relatively short valve housing to be employed, while the relatively fast initial movement of the valve 27 permits the clutch elements to reach the check point relatively fast with respect to the movement of the throttle, thus preventing the racing of the motor in the manner indicated. These two features are highly desirable in connection with the operation of a clutch control mechanism.

The control mechanism also operates in a highly desirable manner upon the movement of the throttle to idling position. Assuming that the throttle is in a fairly wide open position, the lever 81 will be beyond engagement with the stop screw 86, assuming that the valve 27 has been moved to its limit of movement as shown in Figure 2, while the lever 76 will be to the left of the position shown in Figure 4, out of engagement with the stop screw 79. If the throttle then moves to idling position by the releasing of the accelerator pedal, the level 76 moves to the left until it contacts with the stop screw 79, the lever 81 being brought into engagement with the stop screw 86 during such movement. After the movement of the lever 76 is arrested by engagement with the screw 79, the continued upward movement of the accelerator pedal causes the lever 81 to swing in a counterclockwise direction about its pivot 82, and during such movement the pivot pin 104 moves much more rapidly than the pivot pin 101, thus transmitting rapid movement to the valve 27 to effect declutching, while the throttle moves relatively slowly to idling position. Thus motor drag is effectively eliminated, and the device thus operates smoothly when declutching for gear shifting. It also will be apparent that smooth declutching is provided when free wheeling, and this result has been substantially impossible with prior constructions due to the substantial deceleration of the motor prior to clutch disengagement.

It will be apparent of course that the operation of the valve mechanism per se is substantially identical with the operation disclosed in the patent to Edward G. Hill No. 1,964,693, referred to above, except that the movement of the valve 27 is coordinated with the movement of the throttle valve in an entirely different manner to provide the improved results referred to. The valve 27 moves initially relatively rapidly upon opening movement of the throttle to bring the clutch elements into initial contact prior to substantial acceleration of the vehicle engine, and thereafter moves relatively slowly while full clutch engagement takes place during substantial motor acceleration. In the event the throttle is depressed too rapidly, the rapid decrease in the differential pressure in the power device 17 is communicated to the diaphragm 65, whereupon the valve 59 closes to prevent too rapid clutch engagement. Accordingly it will be apparent that the jerking or lunging of the vehicle is effectively prevented.

The operation of the valve mechanism during declutching is also similar to the operation of the valve mechanism disclosed in the prior patent referred to. The principal difference in the operation of the present device lies in the rapid movement of the valve 27 prior to the point at which the throttle reaches idling position to provide rapid and substantial communication between the power device and the intake manifold to completely disengage the clutch prior to the point at which the throttle reaches the idling position. As previously stated, this operation prevents the transmission of motor drag to the vehicle.

The operation of the form of the device shown in Figures 7 and 8 is quite similar to the form previously described and need not be described in detail. Referring to Figure 7 it will be noted that the throttle operating link 126 is connected to the lever 109 instead of to the lever 111, and the difference in this arrangement lies in the fact that no throttle movement will take place upon depression of the accelerator, under ordinary conditions, until the lever 111 has operated the valve mechanism to release the clutch elements for movement to the check point referred to. In other words, instead of relatively fast valve operation and relatively slow throttle operation at the initial depression of the accelerator pedal, the form of the invention illustrated in Figure 7 prevents any operation of the throttle until the clutch elements have reached the check point. The screw 140 contacts with the piston 136 to limit the movement of the lever 111 with respect to the lever 109, and after this limit of movement is reached, further movement of the accelerator pedal causes the levers 109 and 111 to turn as a unit about the axis of the pivot screw 110.

Where fast clutch engagement is desirable, as when the gear shift lever is shifting from second to high gear position with the vehicle moving at a substantial speed, the accelerator pedal may be rapidly depressed to the desired extent, whereupon the piston 136 and cylinder 134 function as a dash pot to cause movement to be transmitted from the lever 111 to the lever 109 slightly prior to the point at which the piston 136 engages the stop screw 140. This arrangement permits rapid engine acceleration and rapid clutch engagement, which is entirely possible under the conditions referred to, without causing any jerking or lunging of the vehicle.

The dash pot elements 114 and 115 may be provided to positively effect declutching upon the sudden complete releasing of the accelerator pedal. The spring 117 may be provided with an auxiliary throttle return spring, or it may be eliminated if sufficient spring tension is provided elsewhere. The opening 16 in the piston 114 is of such size as to permit the relatively free movement of the piston under most conditions, for example when the accelerator pedal is moved relatively rapidly in either direction under the control of the foot of the operator. If the accelerator pedal is suddenly released to release the throttle for movement very rapidly to idling position, the partial vacuum created within the left hand end of the cylinder 115 slightly retards the movement of the lever 109, thus permitting the lever 111 to lead the lever 109, and thus operate the control valve mechanism to provide full communication between the power device 17 and intake manifold slightly prior to the time at which the throttle reaches full idling position. Thus the clutch will be released, or the pressure of the clutch plates will be released to a substantial extent, before the vehicle engine is able to transmit any motor drag to the vehicle.

The form of the invention shown in Figures 7 and 8 is particularly applicable to vehicles having unusually high powered motors with substantial piston displacement. For example, a motor of such character may be unusually rapidly responsive to throttle action whereby very rapid motor acceleration takes place upon opening movement of the throttle. Moreover, a high speed motor of substantial piston displacement may tend to cause motor drag upon the sudden releasing of the accelerator pedal, and the form of invention referred to operates to insure declutching sufficiently early with respect to throttle action to prevent the motor drag referred to. For most installations, the form of the invention shown in Figures 1, 4 and 5 will properly control the valve mechanism for all purposes. The valve mechanism shown in Figures 2 and 3 provides the smoothest and most accurate clutch operation of which we are aware, and while the control means for the valve mechanism is not limited in its use to the type of valve mechanism referred to, its use has been found to be particularly advantageous with such valve mechanism since the combination of the two mechanisms provides remarkably smooth and accurate clutch operation under all conditions.

It is to be understood that the forms of the invention herewith shown and described are to be taken as preferred examples of the same and that various changes in the shape, size and arrangement of parts may be resorted to without departing from the spirit of the invention or the scope of the subjoined claims.

We claim:

1. Clutch control mechanism for a motor vehicle including an engine having a throttle and an accelerator therefor, comprising a power device connected to the clutch, and control means operative with the throttle for effecting relatively more rapid movement of said power device in the range of movement of the throttle adjacent the idling position than in the remaining range of throttle movement.

2. Clutch control mechanism for a motor vehicle including an engine having a throttle and an accelerator therefor, comprising a power device connected to the clutch, control means for the power device including a movable member, and means connecting said movable member to the throttle and operative for effecting relatively more rapid movement of said power device in the range of movement of the throttle adjacent the idling position than in the remaining range of throttle movement.

3. Clutch control mechanism for a motor vehicle including a clutch and an engine having a throttle, comprising a power device connected to the clutch, control means for said power device, and actuating means for rendering said control means operable for actuating said power device upon closing movement of the throttle and for deactuating the power device upon opening movement of the throttle, said actuating means being operative in the initial range of movement of the throttle from idling position for deactuating the power device relatively rapidly with respect to the rate of opening movement of the throttle and then relatively more slowly with respect thereto.

4. Clutch control mechanism for a motor vehicle including a clutch and an engine having a throttle, comprising a power device connected to the clutch, control means for said power device, and actuating means for rendering said control means operable for actuating said power device upon closing movement of the throttle and operative upon opening movement of the throttle for initially releasing the clutch elements for movement toward operative engagement, checking the movement of the clutch elements prior to operative engagement and then releasing the clutch elements for movement into operative engagement, said actuating means being operative relatively rapidly with respect to the rate of movement of the throttle in the initial range of movement of the throttle from idling position for operating said control means to release the clutch elements for movement toward operative engagement and then check the movement of the clutch elements, and then operative relatively more slowly with respect to the rate of movement of the throttle.

5. Clutch control mechanism for a motor vehicle including a clutch and an engine having a throttle, comprising a power device connected to the clutch, control means for said power device including a pair of relatively movable members one of which is actuated in response to the actuation of said power device, and actuating means for the other relatively movable member for causing the actuation of said power device upon closing movement of the throttle and the deactuation of the power device upon opening movement of the throttle, said actuating means being operative in the initial range of movement of the throttle from idling position for deactuating the power device relatively rapidly with respect to the rate of opening movement of the throttle and then relatively more slowly with respect thereto.

6. Clutch control mechanism for a motor vehicle including an engine having a throttle and an accelerator therefor, comprising a power device connected to the clutch, control means for the power device including a movable member, and actuating means connecting the throttle and said movable member to the accelerator and operable for effecting movement of such movable member relatively more rapidly than the throttle in the range of movement of the throttle adjacent the idling position than in the remaining range of throttle movement.

7. Clutch control mechanism for a motor vehicle including a clutch and an engine having a throttle and an accelerator therefor, comprising a differential pressure power device connected to the clutch, control means for said power device including a movable valve, and actuating means connecting the throttle and said valve to the accelerator and operable for moving said valve relatively more rapidly than the throttle in the range of movement of the throttle adjacent the idling position than in the remaining range of throttle movement.

8. Clutch control mechanism for a motor vehicle including a clutch and an engine having a throttle and an accelerator therefor, comprising a differential pressure power device connected to the clutch, control means for said power device including a pair of control valves one of which is movable upon movement of the power device, and actuating means connecting the throttle and said other valve to the accelerator and operative for moving said other valve relatively more rapidly in the range of movement of the throttle adjacent idling position than in the remaining range of throttle movement.

9. Clutch control mechanism for a motor vehicle including a clutch and an engine having a throttle and an accelerator therefor, comprising a differential pressure power device connected to the clutch, control means for said power device including a movable valve, and actuating means connecting the throttle and said valve to the accelerator and including lever means operable for moving said valve relatively more rapidly in the range of movement of the throttle adjacent the idling position than in the remaining range of throttle movement.

10. Clutch control mechanism for motor vehicles including a clutch and an engine having a throttle and an accelerator therefor, comprising a differential pressure power device connected to the clutch, control valve means for said power device including a pair of control valves one of which is movable upon movement of the power device, and actuating means connecting the throttle and said other valve to the accelerator and including lever means operative for moving said other valve relatively more rapidly in the range of movement of the throttle adjacent the idling position than in the remaining range of throttle movement.

11. Clutch control mechanism for a motor vehicle including a clutch and an engine having a throttle and an accelerator therefor, comprising a differential pressure power device connected to the clutch, control means for said power device including a movable valve, lever means connecting the throttle and said valve to the accelerator, and means for changing the effective lever lengths of said lever means for effecting movement of said valve relatively more rapidly in the range of movement of the throttle adjacent the idling position than in the remaining range of throttle movement.

12. Clutch control mechanism for a motor vehicle including a clutch and an engine having a throttle and an accelerator therefor, comprising a differential pressure power device connected to the clutch, control means for said power device including a pair of cooperating relatively movable control valves one of which is movable upon movement of the power device, lever means connecting the throttle and said other valve to the accelerator, and means for changing the effective lever lengths of said lever means for moving said other valve relatively more rapidly in the range of movement of the throttle adjacent idling position than in the remaining range of throttle movement.

13. Clutch control mechanism for a motor vehicle including a clutch and an engine having a throttle and an accelerator therefor, comprising a differential pressure power device connected to the clutch, control means for said power device including a movable valve, a pair of levers pivotally connected to each other adjacent one end, means for pivotally supporting one lever adjacent its other end, means connecting the other lever to the accelerator, means connecting one lever to said valve, means connecting one lever to said throttle, and means operative upon movement of the accelerator for altering the operation of said levers for moving said valve relatively more rapidly in the range of movement of the throttle adjacent the idling position than in the remaining range of throttle movement.

14. Clutch control mechanism for a motor vehicle including a clutch and an engine having a throttle and an accelerator therefor, comprising a differential pressure power device connected to the clutch, control means for said power device including a movable valve, a pair of levers pivotally connected to each other adjacent one end, means for pivotally supporting one lever adjacent its other end, means for connecting one of said levers to said accelerator, a connection between the throttle and one lever, a connection between said valve and one lever, said first named connection being closer to the pivotal connection between said levers than said second named connection, and means for preventing turning movement of said levers with respect to each other except in the initial range of movement of the accelerator.

15. Clutch control mechanism for a motor vehicle including a clutch and an engine having a throttle and an accelerator therefor, comprising a differential pressure power device connected to the clutch, control means for said power device including a movable valve, a pair of levers pivotally connected to each other adjacent one end, means for pivotally supporting one lever adjacent its other end, means connecting the other lever to the accelerator, a connection between the throttle and one lever, a connection between said valve and one lever, said first named connection being closer to the pivotal connection between said levers than said second named connection, and means for limiting the turning movement of said other lever with respect to the first named lever as the accelerator is depressed to open the throttle from idling position.

16. Clutch control mechanism for a motor vehicle including an engine having a throttle and an accelerator therefor, comprising a power device connected to the clutch, control means for the power device including a movable member, and actuating means connecting the throttle and said movable member to the accelerator and operable for effecting movement of such movable member relatively more rapidly than the throttle in the range of movement of the throttle adjacent the idling position than in the remaining range of throttle movement when the accelerator is operated at a speed less than a predetermined speed, and means for causing said actuating means to open the throttle relatively more rapidly in the range of movement adjacent the idling position when the accelerator is operated at a rate of speed greater than said predetermined speed.

17. Clutch control mechanism for a motor vehicle including a clutch and an engine having a throttle and an accelerator therefor, comprising a differential pressure power device connected to the clutch, control means for said power device including a movable valve, and actuating means connecting the throttle and said valve to the accelerator and operable for moving said valve relatively more rapidly than the throttle in the range of movement of the throttle adjacent the idling position than in the remaining range of throttle movement when the accelerator is operated at a speed less than a predetermined speed, and means for causing said actuating means to open the throttle relatively more rapidly in the range of movement adjacent the idling position when the accelerator is operated at a rate of speed greater than said predetermined speed.

18. Clutch control mechanism for a motor vehicle including an engine having a throttle and an accelerator therefor, comprising a power device connected to the clutch, control means for the power device including a movable member, actuating means connecting the throttle and said movable member to the accelerator and operable for effecting movement of such movable member relatively more rapidly than the throttle in the range of movement of the throttle adjacent the idling position than in the remaining range of throttle movement, and means for retarding closing movement of the throttle with respect to said movable member in the range of movement adjacent the idling position when the accelerator is released for movement at a speed greater than a predetermined speed.

19. Clutch control mechanism for a motor vehicle including a clutch and an engine having a throttle and an accelerator therefor, comprising a differential pressure power device connected to the clutch, control means for said power device including a movable valve, actuating means connecting the throttle and said valve to the accelerator and operable for moving said valve relatively more rapidly than the throttle in the range of movement of the throttle adjacent the idling position than in the remaining range of throttle movement, and means for retarding closing movement of the throttle with respect to said valve in the range of movement adjacent the idling position when the accelerator is released for movement at a speed greater than a predetermined speed.

20. Clutch control mechanism for a motor vehicle including an engine having a throttle and an accelerator therefor, comprising a power device connected to the clutch, control means for the power device including a movable member, actuating means connecting the throttle and said movable member to the accelerator and operable for effecting movement of such movable member relatively more rapidly than the throttle in the range of movement of the throttle adjacent the idling position than in the remaining range of throttle movement, means for causing said actuating means to open the throttle relatively more rapidly in the range of movement adjacent the idling position when the acclerator is operated at a rate of speed greater than a predetermined speed, and means for retarding closing movement of the throttle with respect to said movable member in the range of movement adjacent the idling position when the accelerator is released for movement at a speed greater than a predetermined speed.

21. Clutch control mechanism for a motor vehicle including a clutch and an engine having a throttle and an accelerator therefor, comprising a differential pressure power device connected to the clutch, control means for said power device including a movable valve, actuating means connecting the throttle and said valve to the accelerator and operable for moving said valve relatively more rapidly than the throttle in the range of movement of the throttle adjacent the idling position than in the remaining range of throttle movement, means causing said actuating means to open the throttle relatively more rapidly in the range of movement adjacent the idling position when the accelerator is operated at a rate of speed greater than a predetermined speed, and means for retarding movement of the throttle with respect to said valve toward closed position in the range of movement adjacent idling position when the accelerator is released for movement at a speed greater than a predetermined speed.

22. Actuating means for a motor vehicle clutch control mechanism comprising a lever pivotally supported adjacent one end, a second lever pivotally connected at one end to the other end of said first named lever, an engine throttle connection connected to one lever, a connection for the clutch control mechanism connected to one lever, an engine accelerator connection connected at one end to said second named lever, and means for limiting the turning movement of said second named lever with respect to said first named lever.

23. In a motor vehicle having a throttle and an accelerator connected thereto, a clutch, and control mechanism for the clutch, actuating means for the clutch control mechanism comprising a lever pivotally supported adjacent one end, a second lever pivotally connected at one end to the other end of said first named lever, a pair of connections connected to said second named lever and adapted for connection respectively with the vehicle engine throttle and the clutch control mechanism, a third operating connection connected at one end to said second lever and adapted for connection at its other end to the accelerator of the vehicle, and means for limiting the turning movement of said second named lever with respect to said first named lever.

EDWARD G. HILL.
HENRY W. HEY.